United States Patent
Mun (10) Patent No.: US 10,674,097 B2
(45) Date of Patent: *Jun. 2, 2020

(54) PORTABLE STUDIO APPARATUS

(71) Applicant: ORANGEMONKIE KOREA, INC., Seoul (KR)

(72) Inventor: Sang Kon Mun, Seoul (KR)

(73) Assignee: ORANGEMONKIE KOREA, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,487

(22) Filed: Nov. 15, 2018

(65) Prior Publication Data

US 2019/0089912 A1    Mar. 21, 2019

Related U.S. Application Data

(63) Continuation of application No. PCT/KR2018/005335, filed on May 10, 2018.

(30) Foreign Application Priority Data

May 15, 2017    (KR) .......................... 10-2017-0059717

(51) Int. Cl.
*H04N 5/28* (2006.01)
*G03B 15/06* (2006.01)

(52) U.S. Cl.
CPC .............. *H04N 5/28* (2013.01); *G03B 15/06* (2013.01)

(58) Field of Classification Search
None
See application file for complete search history.

(56) References Cited

U.S. PATENT DOCUMENTS

| | | | | |
|---|---|---|---|---|
| 3,531,170 | A * | 9/1970 | Boyer | A47B 19/08 312/259 |
| 9,513,537 | B2 * | 12/2016 | Mun | G03B 15/06 |
| 2012/0163782 | A1 * | 6/2012 | McColl | G03B 15/06 396/3 |
| 2016/0282705 | A1 * | 9/2016 | Johnson | G03B 15/06 |

OTHER PUBLICATIONS

"Folding Portable Lightbox Studio—Take Pictures Like a Pro on the Go with a Smartphone or DSLR Camera." Amazon https://www.amazon.com/Folding-Portable-Lightbox-Studio-Smartphone/dp/B01SOSG376 (Year: 2015).*
"Photo Light Box for Jewellery and Small Items ( Size 9 ×9 ×9.5"/ 22 ×22 ×24cm ) with Two Backdrops Included by Cofunia Brand" Amazon https://www.amazon.com/Photo-Jewellery-Backdrops-Included-Cofunia/dp/B01M9IPG53 (Year: 2017).*

* cited by examiner

*Primary Examiner* — Clayton E. LaBalle
*Assistant Examiner* — Dennis Hancock
(74) *Attorney, Agent, or Firm* — Studebaker & Brackett PC (57) ABSTRACT

Provided is a portable studio apparatus capable of obtaining high photographing quality by minimizing light of an inner illumination device that is irradiated to an outside, and capable of photographing a large-sized subject by minimizing a size of the portable studio apparatus when the portable studio apparatus is carried while increasing a size of an accommodation space when the portable studio apparatus is assembled.

7 Claims, 10 Drawing Sheets

PORTABLE STUDIO APPARATUS

CROSS-REFERENCE TO RELATED APPLICATIONS

The present application is a Continuation of International Patent Application No. PCT/KR2018/005335 filed May 10, 2018, which is based upon and claims benefit of priority to Korean Patent Application No. 10-2017-0059717 filed May 15, 2017, the entire contents of which are hereby incorporated by reference into the present application.

TECHNICAL FIELD

The present invention relates to a portable apparatus capable of obtaining an effect similar to photographing in a studio by disposing a subject inside the apparatus, and more particularly, to an apparatus in which the apparatus is able to be conveniently assembled and disassembled by a user, the apparatus is capable of obtaining an effect similar to photographing in a studio by disposing a subject in an inner space of the apparatus and photographing the subject when the apparatus is assembled, and the apparatus is able to be folded and carried after being dissembled.

Recently, as a social network service (SNS) and an online personal shopping mall has become actively running, various platforms are being developed to share information on an article owned by a user, or to expose information on articles for sale online. Particularly, a two-dimensional or three-dimensional image of an article is taken and posted online to share image information of the article or to expose the image of the article for sale.

Image quality of such an image of the article exerts an influence on increase in a sales rate, and the quality of the shared image determines a degree of sharing, so that many people take photographs in an excellent background or rent a studio to take photographs of the article. However, even if general users take photographs of the article on a clean background, there is a problem that the background has insufficient quality, and photographing quality is degraded due to a shadow, etc.

Meanwhile, if the studio is rented to photograph the article, the above-described problem of the photographing quality may be solved. However, a rental cost for the studio is highly expensive, and the user may not take a desired image.

Therefore, various portable studio units have been developed recently. There was a studio unit which is able to be assembled and disassembled so as to be carried and defines an accommodation space having a hexahedron shape of which one side is open when the studio unit is assembled.

However, according to the related art described above, light emitted from an inside of the studio unit is irradiated to an outside with a very high probability and may not be reflected at the inside, which causes a shadow or the like or insufficient irradiation of light even if an illumination device is installed at the inside, so that background image quality is degraded so as to degrade the photographing quality. In addition, considering portability, a size of a folded studio unit is limited, so that a size of the accommodation space may not be large when the studio unit is assembled, which limits a size of a photographing target subject.

To solve the problems of the related art in addition to the above-described related art, one object of the present invention is to provide a novel portable studio apparatus which is portable, is able to improve photographing quality by maximizing an amount of light reflected to an inside of the apparatus when the apparatus is assembled and an illumination device for emitting light is installed at the inside of the apparatus, and is able to ensure an open space for photographing a subject positioned within an inner accommodation space.

In addition, another object of the present invention is to provide a technique capable of minimizing limitation of a size of a photographing target subject by maximizing a size of the inner accommodation space when the studio apparatus is assembled, by using the present invention having a size which is able to be further reduced in comparison with the related art described above.

SUMMARY

To achieve the objects described above, according to one embodiment of the present invention, there is provided a portable studio apparatus including: a first body part forming a bottom surface; a second body part coupled to one end of the first body part and foldably or unfoldably connected to the first body part; a third body part foldably or unfoldably connected to the second body part at an opposite side of a portion of the second body part at which the second body part is connected to the first body part; a fourth body part foldably or unfoldably connected to the third body part at an opposite side of a portion of the third body part at which the third body part is connected to the second body part; and a pair of sub-body parts formed at both ends of the first body part and the fourth body part in a direction orthogonal to an axis extending in a connection direction of the first body part to the fourth body part, and foldably or unfoldably connected to the first body part and the fourth body part, wherein, in a photographing mode, the first body part to the fourth body part are folded at an angle larger than a right angle with respect to each other, the fourth body part is inclined relatively to the first body part at an angle which allows the fourth body part to be directed toward a bottom such that the fourth body part partially covers an open front region of a region defined by the first body part to the fourth body part, and the sub-body parts formed on an identical side are fixedly connected to each other, such that the sub-body parts form an accommodation space by defining a side surface except for the region defined by the first body part to the fourth body part among open regions formed by the first body part to the fourth body part while the sub-body parts fix the first body part to the fourth body part which are folded at the angle larger than the right angle with respect to each other, in which a subject positioned within the accommodation space defined by the first body part to the fourth body part and the sub-body part is photographed through an open front side, and, in a portable mode after the photographing mode is terminated, the first body part to the fourth body part are folded to overlap with each other, and the sub-body parts are folded to overlap with a region at which the first body part to the fourth body part overlap with each other, which allows the portable studio apparatus to be carried and stored in a form of a plate.

According to the present invention described above, according to a connection angle among the first body part to the fourth body part when the first body part to the fourth body part are fixedly connected by the sub-body part, the portable studio apparatus is assembled such that the fourth body part is inclined relatively to the first body part at the connection angle which allows the fourth body part to be directed toward a bottom without being arranged in parallel with the first body part, so that the region defined by the first body part to the fourth body part is partially covered at the open front region. Accordingly, when light emitted from the inside of the portable studio apparatus is irradiated to the front side, the light is reflected by the fourth body part and incident to the inside again due to the inclined assembling structure of the fourth body part, so that efficiency of the illumination device becomes very high. In addition, the subject positioned in the inner accommodation space can be photographed through the open front region, so that the photographing quality for the subject becomes extremely high.

Meanwhile, since four body parts, which are the first to fourth body parts, are configured to be folded with respect to each other in order to adopt the above-described structure, when the first to fourth body parts are folded to overlap with each other in the portable mode, the size of the apparatus is greatly reduced in comparison with the related art, so that the size of the accommodation space of the present invention is maximized when compared with the size of the related art in an identical portable mode. Accordingly, the limitation of the size of the photographing target subject is minimized, so that a larger subject can be efficiently photographed.

DETAILED DESCRIPTION

Hereinafter, a portable studio apparatus according to one embodiment of the present invention will be described with reference to the accompanying drawings.

It is to be understood that the following embodiments are intended to illustrate the present invention in detail, and are not to be construed as limiting the scope of the present invention. Accordingly, equivalents performing the same function as the present invention are also within the scope of the present invention.

In addition, when reference numerals are given to the elements of the drawings, it should be noted that the same reference numerals are used to designate the same or similar elements even when they are shown in different drawings. In addition, detailed descriptions of well-known functions and structures incorporated herein may be omitted when they make the subject matter rather unclear.

In addition, the terms such as "first", "second", "A", "B", "(a)", "(b)", etc. can be used to describe the elements of the present invention. The terms are for discriminating one element from another element, but the scope, order, or sequence of the elements is not limited to the terms. When one element is described as being "connected", "coupled", or "accessed" to another element, it shall be construed as being connected or accessed to the other element directly, but also possibly having another element as being "connected", "coupled", or "accessed" in between.

In addition, referring to FIGS. 1 to 8, some of the configurations have been added, omitted, reduced and enlarged in order to clearly illustrate the technical features of the present invention, but the scope of the present invention is not limited to a form and a size of each configuration.

Figure 1:
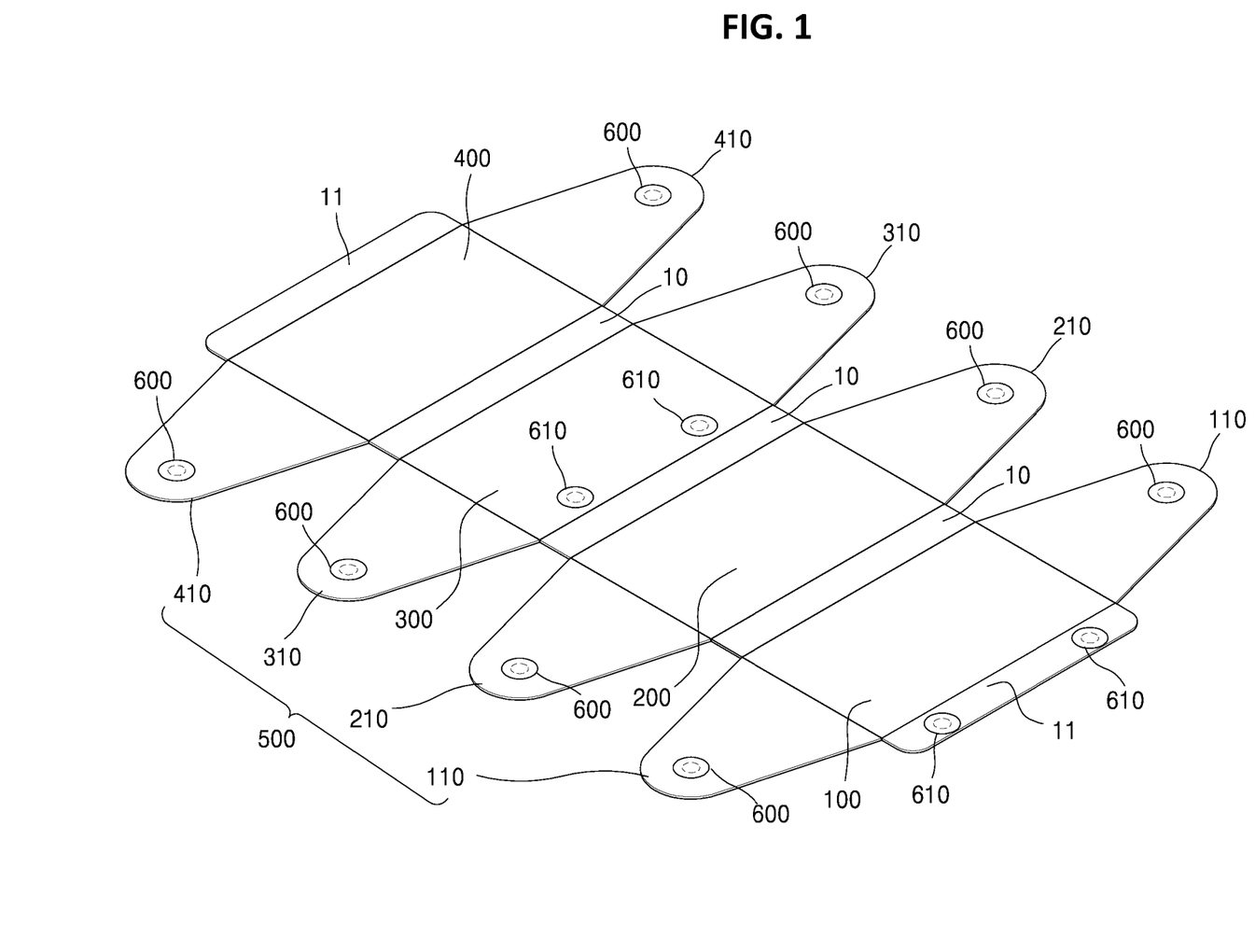
FIGS. 1 and 2 are an exploded perspective view and a plan view showing a portable studio apparatus according to one embodiment of the present invention, respectively.
Figure 2:
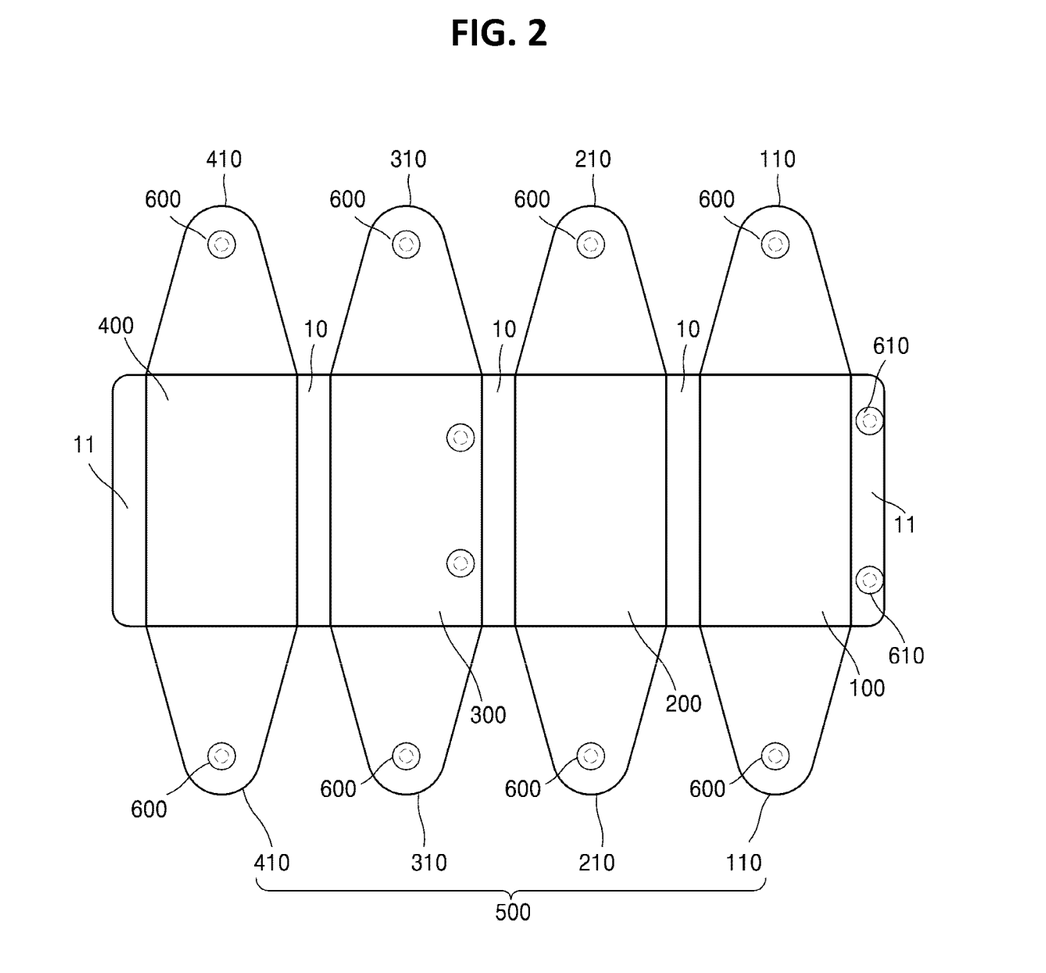

FIGS. 1 and 2 are an exploded perspective view and a plan view showing a portable studio apparatus according to one embodiment of the present invention, respectively.

As shown in FIGS. 1 and 2, a portable studio apparatus according to one embodiment of the present invention includes a first body part 100, a second body part 200, a third body part 300, a fourth body part 400, and a sub-body part 500 connected to sides of the body parts 100, 200, 300 and 400. In this case, depending on embodiments of the present invention, the sub-body part 500 may be composed of only a first sub-body part 110 provided at the first body part 100 and a fourth sub-body part 410 provided at the fourth body part 400, and may optionally further include a second sub-body part 210 provided at the second body part 200 and a third sub-body part 310 provided at the third body 300. As shown in FIGS. 1 and 2, the sub-body part 500 is foldably or unfoldably connected to the first to fourth body parts 100, 200, 300 and 400 at both side ends of the first to fourth body parts 100, 200, 300 and 400.

The first body part 100 forms a bottom surface upon assembly. In other words, the first body part 100 forms a region where a subject is positioned when the portable studio apparatus is assembled. The second body part 200 is foldably or unfoldably connected to the first body part 100 as shown in FIG. 1. The third body part 300 is connected to the second body part 200 as shown in FIG. 1, such that the third body part 300 is foldably or unfoldably connected to the second body part 200 while being connected to one end of the second body part 200 at an opposite side of a portion of the second body part 200 in which the second body part 200 is connected to the first body part 100. The fourth body part 400 is connected to the third body part 300 as shown in FIG. 1, such that the fourth body part 400 is foldably or unfoldably connected to the third body part 300 while being connected to one end of the third body part 300 at an opposite side of a portion of the third body part 300 in which the third body part 300 is connected to the second body part 200.

As described above, the sub-body part 500 is provided in a pair at both ends of at least the first body part 100 and the fourth body part 400, such that the pair of sub-body parts 500 are formed at the both ends in a direction orthogonal to an axis extending in a connection direction of the first to fourth body parts 100, 200, 300 and 400. In addition, the sub-body part 500 is foldably or unfoldably connected to the first body part 100 and the fourth body part 400 as shown in FIG. 1.

As described above, similar to the first sub-body part 110 and the fourth sub-body 410, the second and third sub-body parts 210 and 310 are provided as a pair on the both ends of the second body part 200 and the third body part 300, such that the second and third sub-body parts 210 and 310 are formed at the both ends in a direction orthogonal to an axis extending in a connection direction of the first to fourth body parts 100, 200, 300 and 400. In addition, the second and third sub-body parts 210 and 310 are foldably or unfoldably connected to the second body part 200 and the third body part 300, respectively, as shown in FIG. 1.

In this case, a first auxiliary body part 10 may be formed between the first to fourth body parts 100, 200, 300 and 400 in order to prevent the body parts from being bent when the body parts are folded by ensuring a folding thickness for allowing folding of each body part between respective body parts as described above. In addition, a second auxiliary body part 11 may be formed on an end of the first body part 100 or the fourth body part 400 which is not connected to other body parts in order to prevent the body parts from being damaged when folded and to increase portability.

As described below, when the photographing mode is set and the assembly is completed, the first to fourth body parts 100, 200, 300 and 400 are folded at an angle larger than a right angle, that is, an obtuse angle with respect to each other, while the fourth body part 400 is inclined relatively to the first body part 100 at an angle which allows the fourth body part 400 to be directed toward a bottom surface. In other words, in the photographing mode, the angle formed by a line in a plane direction of the fourth body part 400 and a ground is configured such that the fourth body part 400 is downwardly inclined to the ground at a predetermined angle. Accordingly, the fourth body part 400 partially covers an open front region of the region defined by the first to fourth body parts 100, 200, 300 and 400.

Meanwhile, as the sub-body parts 500 are fixedly connected to each other at the completion of assembly in the photographing mode, the sub-body parts 500 form an accommodation space by defining a side surface except for a region defined by the first to fourth body parts 100, 200, 300 and 400 among open regions formed by the first to fourth body parts 100, 200, 300 and 400, while the sub-body parts 500 fix the first to fourth body parts 100, 200, 300 and 400 which are folded at the angle larger than the right angle, that is, the obtuse angle with respect to each other, so that the subject positioned within the accommodation space defined by the first to fourth body parts 100, 200, 300 and 400, particularly for example, on the first body part 100 is photographed through the open front side described above.

Meanwhile, as described below, when the photographing mode is terminated and the portable mode is set, since the first to fourth body parts 100, 200, 300 and 400 are folded to overlap with each other, the sub-body parts 500 are folded to overlap with a region at which the first to fourth body parts 100, 200, 300 and 400 overlap with each other, for example, between regions at which the first to fourth body parts 100, 200, 300 and 400 are folded to overlap with each other, so that the portable studio apparatus can be carried and stored in a form of a plate.

In the above example, assuming that lengths of the first to fourth body parts 100, 200, 300 and 400 in a connection direction of the first to fourth body parts 100, 200, 300 and 400 are equal to each other, for example, in the photographing mode, the first to fourth body parts 100, 200, 300 and 400 and the open front region may form a regular pentagon. In this case, as described above, the angle formed between the fourth body part 400 and the ground in the photographing mode may be about 36 degrees while the fourth body part 400 is downwardly directed to the ground. However, the angle formed between the fourth body part 400 and the ground may be any angle that allows the fourth body part 400 to be downwardly directed to the ground in addition to the above-described angle.

In the above example, the first to fourth body parts 100, 200, 300 and 400 are fixedly connected by the connection of the sub-body parts 500, so that the angle between the first to fourth body parts 100, 200, 300 and 400 upon the connection may vary depending on a length of the sub-body part 500 toward a central point of the connection when the sub-body parts 500 are connected to each other.

The sub-body part coupling device 600 is included in the first to fourth sub-body parts 110, 210, 310 and 410 described above, and allows the first to fourth sub-body parts 110, 210, 310 and 410 to be coupled to each other while the first to fourth sub-body parts 110, 210, 310 and 410 are connected to each other to allow the sub-body parts 500 to be fixedly connected to each other in the photographing mode as described above. The sub-body part coupling device 600 may be installed as shown in FIG. 1 at one region the first to fourth sub-body parts 110, 210, 310 and 410 on an opposite side of the foldably or unfoldably connected ends of the first to fourth body parts 100, 200, 300 and 400 among ends of the first to fourth sub-body parts 110, 210, 310 and 410.

In this case, the sub-body part coupling device 600 may include a magnetic coupling device having a magnetic body and a magnetizable body, so that sub-body part coupling devices 600 may be magnetically coupled to each other.

Meanwhile, a folded state fixing device 610 is provided to fix the first to fourth body parts 100, 200, 300 and 400 and the sub-body parts 110, 210, 310 and 410 in a folded state while the first to fourth body parts 100, 200, 300 and 400 are folded to overlap with each other, and the sub-body parts 110, 210, 310 and 410 are folded to overlap with the region at which the first to fourth body parts 100, 200, 300 and 400 overlap with each other in the portable mode as described above. As shown in FIG. 1, the folded state fixing device 610 may be preferably formed at the first body part 100 and the third body part 300, but embodiments are not limited thereto.

In this case, similar to the sub-body part coupling device 600, the folded state fixing device 610 may include a magnetic coupling device having a magnetic body and a magnetizable body, so that folded state fixing devices 610 may be magnetically coupled to each other.

Depending on embodiments of the present invention, depending on installation positions of the sub-body part coupling device 600 and the folded state fixing device 610 in the portable mode, the positions may be set to allow the sub-body part coupling device 600 to be fixed to the folded state fixing device 610.

Figure 3:
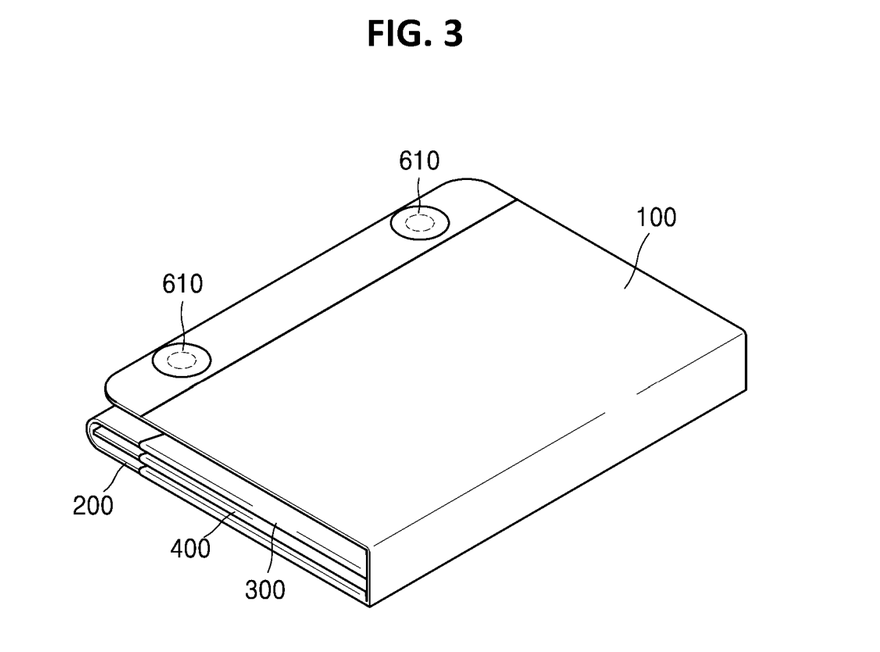
FIG. 3 is a perspective view showing the portable studio apparatus in a portable mode according to one embodiment of the present invention.

An example of the above case is shown in FIG. 3. FIG. 3 is a perspective view showing the portable studio apparatus in a portable mode according to one embodiment of the present invention.

Referring to FIG. 3, in the portable mode, the first body part 100, the second body part 200, the third body part 300, and the fourth body part 400 are sequentially folded to overlap with each other. In this case, the sub-body part will be folded between the body parts as described above. In the portable mode, as described above, the first to fourth body parts 100, 200, 300 and 400 are firmly fixed in the folded state by the folded state fixing device, so that the user may carry the apparatus in a form of a folded plate as shown in FIG. 3.

Figure 4:
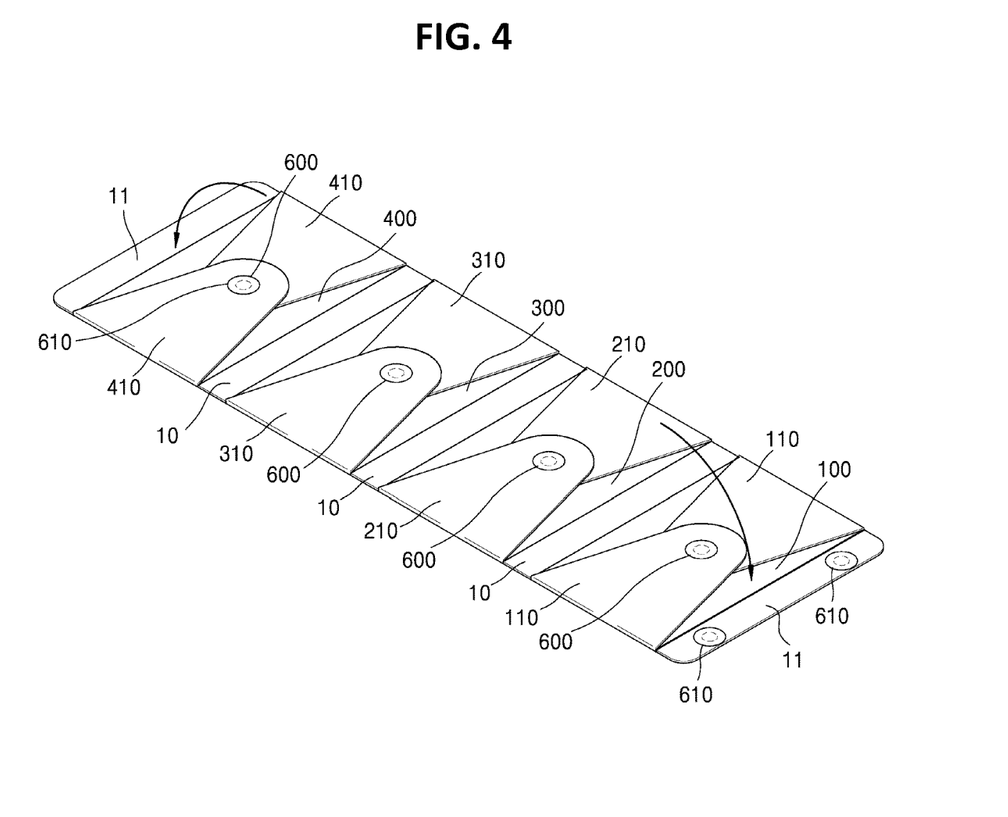
FIGS. 4 to 6 are views showing operation states sequentially displaying a process of switching from the portable mode of FIG. 3 to a photographing mode.
Figure 5:
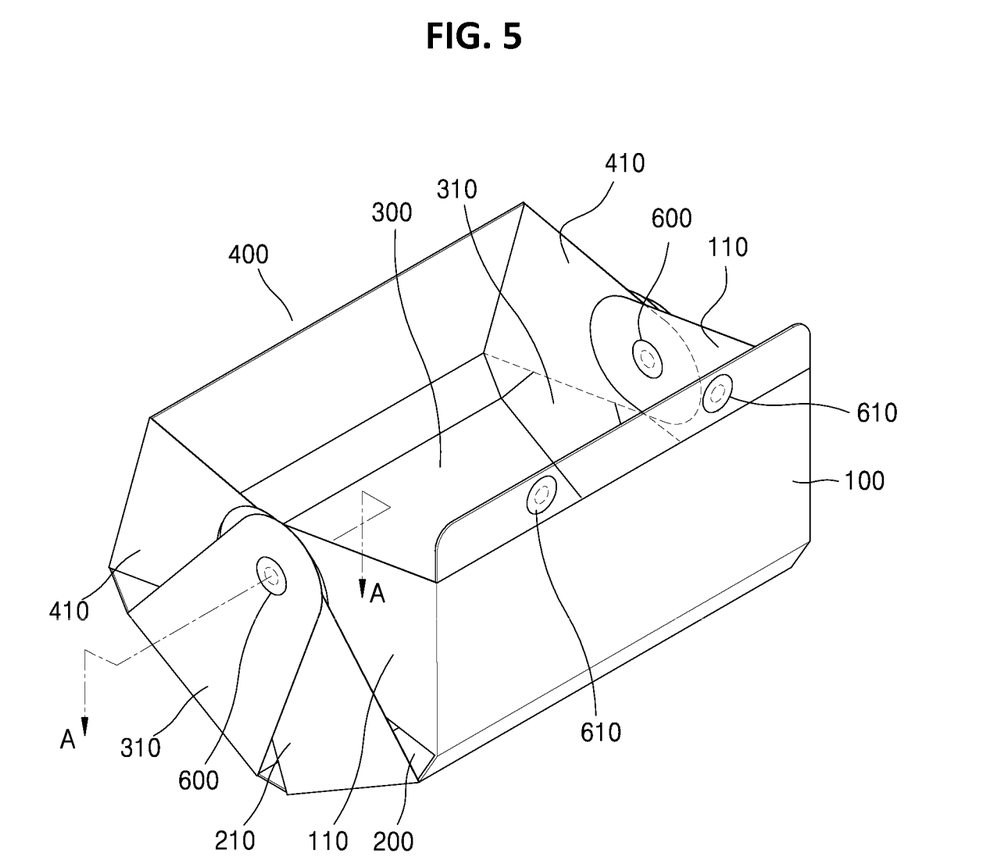
Figure 6:
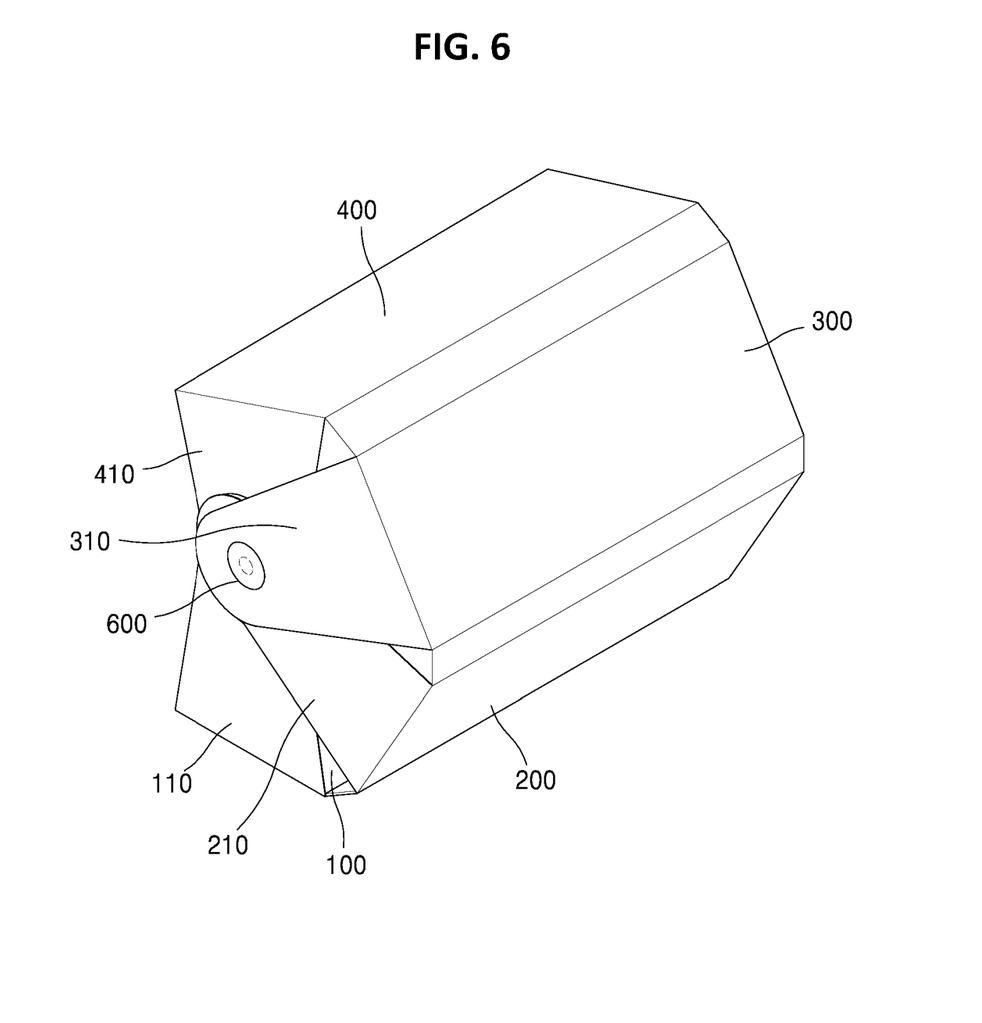

FIGS. 4 to 6 are views showing operation states sequentially displaying a process of switching from the portable mode of FIG. 3 to a photographing mode. In the following description, the redundant description of the elements described with reference to FIGS. 1 to 3 will be omitted.

FIG. 4 shows a state in which the first to fourth body parts 100, 200, 300 and 400 are unfolded in a plane in the portable mode of FIG. 3. As shown in FIG. 4, the first to fourth body parts 100, 200, 300 and 400 are unfolded, and the first and second body parts 10 and 11 may be further included as described above. In this case, the first to fourth sub-body parts 110, 210, 310 and 410 may still be maintained in the folded state by the sub-body part coupling device 600, and the sub-body part coupling device 600 may be provided in a state as shown in FIG. 4 so that the pairs of the 110, 210, 310 and 410 are maintained in the folded state. In other words, each pair of the first to fourth sub-body parts 110, 210, 310 and 410 are attached to each other by respective sub-body part coupling devices 600.

In this state, the first body part 100, the second body part 200, the third body part 300, and the fourth body part 400 are folded at the above-mentioned connection angle. In this case, for convenience, as the second body part 200, the third body part 300, and the fourth body part 400 are folded while the first body part 100 may face the bottom surface as shown in FIG. 6, the first to fourth sub-body parts 110, 210, 310 and 410 disposed on an identical side may be sequentially folded while being coupled to each other through the sub-body part coupling devices 600.

As a result, as shown in FIG. 5, the first to fourth body parts 100, 200, 300 and 400 are coupled to each other at an obtuse angle, and the coupling state is maintained such that the first to fourth sub-body parts 110, 210, 310 and 410 are attached and coupled to each other on the identical side by the sub-body part coupling devices 600. In this case, the folded state fixing devices 610 may be separated from each other.

Finally, as shown in FIG. 6, the first body part 100 forms the bottom surface, the first to fourth body parts 100, 200, 300 and 400 are coupled to each other at an obtuse angle by support-coupling of the first to fourth sub-body parts 110, 210, 310 and 410, and the fourth body part 400 is inclined so as to be directed toward the bottom surface without being parallel to the first body part 100, thereby completing the photographing mode.

Figure 7:
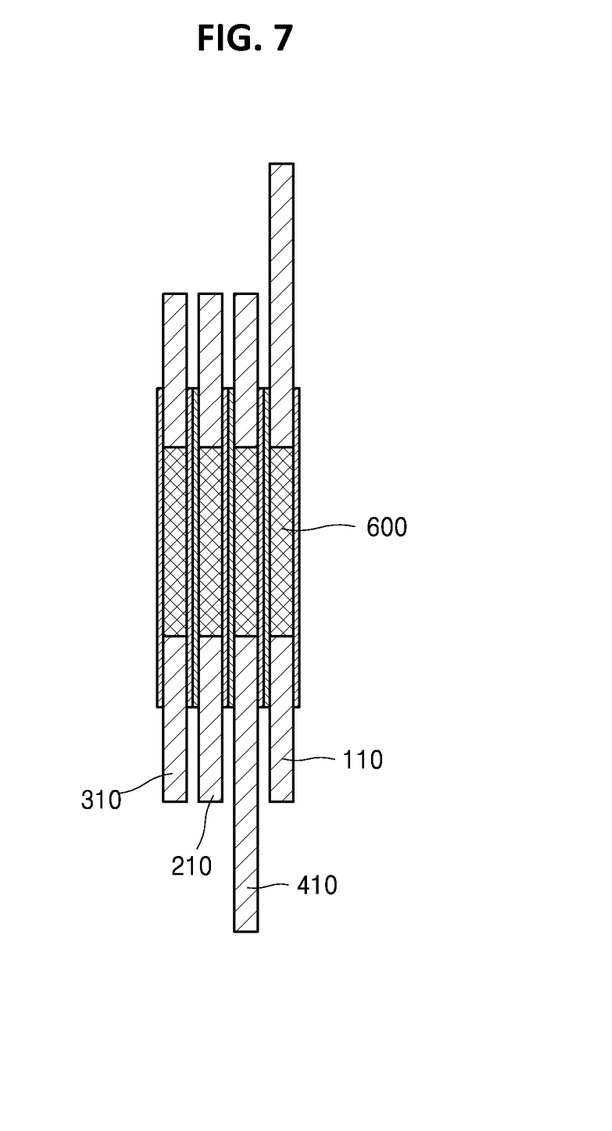
FIG. 7 is a sectional view taken along the line A-A in FIG. 5.

FIG. 7 is a sectional view taken along the line A-A in FIG. 5. Referring to FIG. 7 with FIGS. 4 to 6, the first to fourth sub-body parts 110, 210, 310 and 410 are connected to each other by the sub-body part coupling devices 600 and define side surfaces of the region defined by the first to fourth body parts 100, 200, 300 and 400. Finally, the first to fourth body parts 100, 200, 300 and 400 and the first to fourth sub-body parts 110, 210, 310 and 410 form the accommodation space as shown in FIG. 6, and the front side of the accommodation space is opened while being partially covered by the fourth body part 400.

Figure 8:
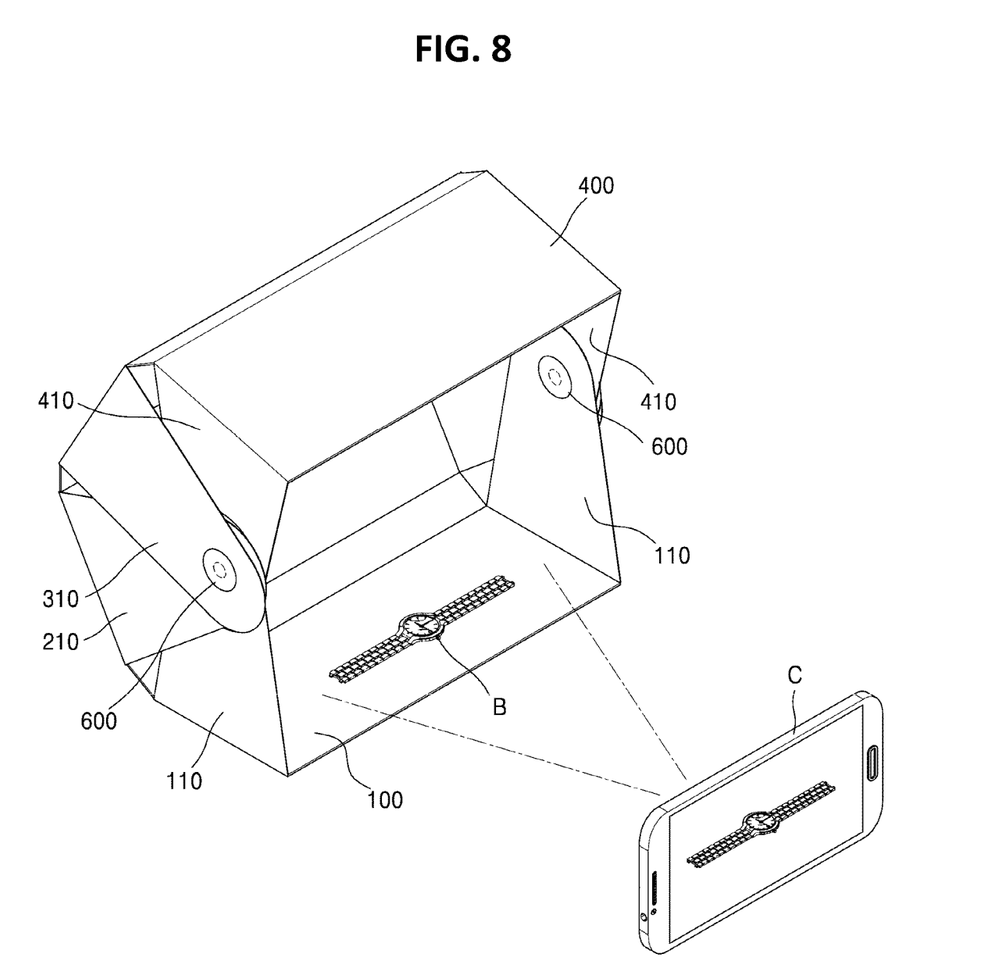
FIG. 8 is a perspective view for explaining a use state in the photographing mode according to one embodiment of the present invention.

FIG. 8 is a perspective view for explaining a use state in the photographing mode according to one embodiment of the present invention.

When the photographing mode is finally completed as described above, the first to fourth sub-body parts 110, 210, 310 and 410 are connected to each other by the sub-body part coupling devices 600 and define side surfaces of the region defined by the first to fourth body parts 100, 200, 300 and 400. Finally, the first to fourth body parts 100, 200, 300 and 400 and the first to fourth sub-body parts 110, 210, 310 and 410 form the accommodation space as shown in FIG. 6, and the front side of the accommodation space is opened while being partially covered by the fourth body part 400.

In this case, the user may position a subject B on the first body part 100 and photograph the subject B by using a photographing device C through the open front region that is partially covered. Although not mentioned in the above description, depending on embodiments of the present invention, a background member for providing a background may be additionally and detachably attached to a part or all of inner surfaces of the first to fourth body parts 100, 200, 300 and 400.

Figure 9:
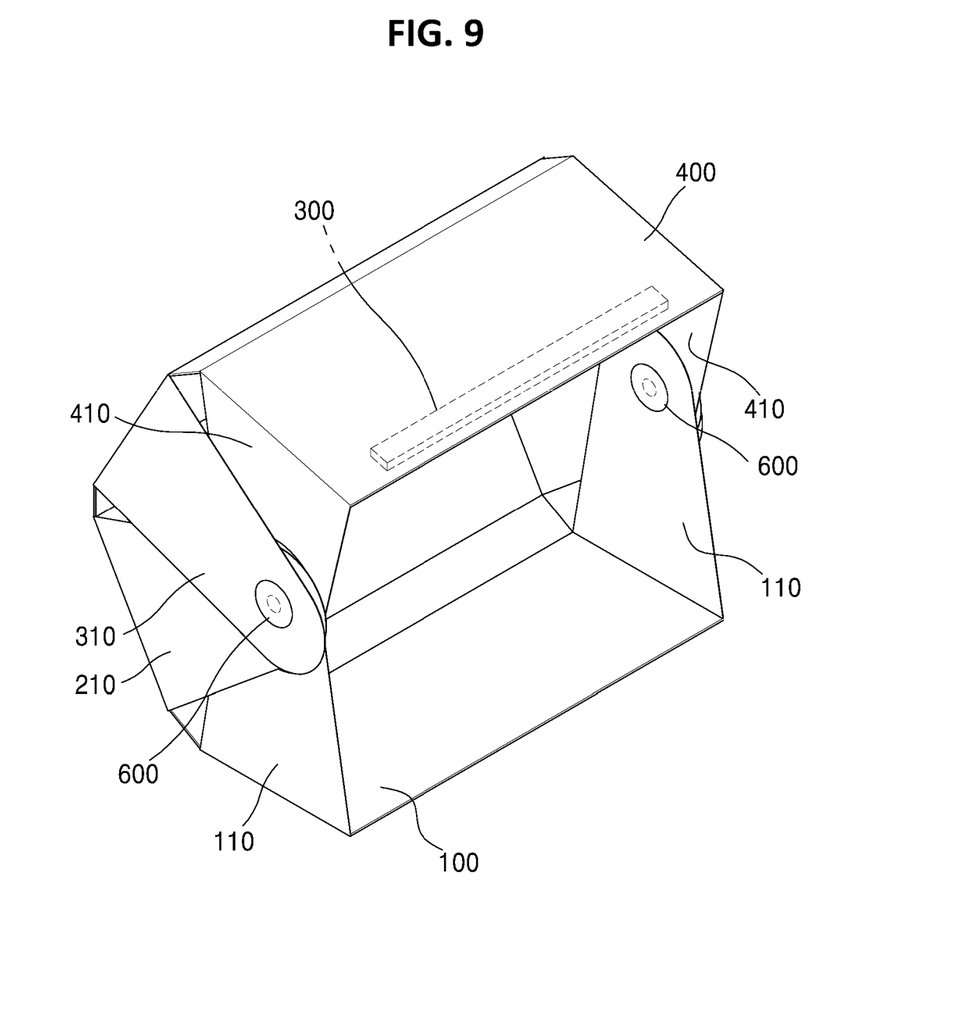
FIG. 9 is a perspective view for explaining a state in which a light source is installed according to one embodiment of the present invention.

FIG. 9 is a perspective view for explaining a state in which a light source is installed according to one embodiment of the present invention.

In the present invention, in order to improve the photographing quality, a light source 800 may be installed on the inner surface of at least one of the first to fourth body parts 100, 200, 300 and 400, that is, a surface at the accommodation space. As shown in FIG. 9, the light source 800 is preferably installed in the fourth body part 400 according to the connection angle of the fourth body part 400, but embodiments are not limited thereto.

When the light source 800 is installed in the fourth body part 400, light is irradiated toward the inner accommodation space without being directed to an outside by the inclination of the fourth body part 400 described above. Accordingly, the light is not directly irradiated from the photographing device but is reflected by the background, thereby improving the photographing quality for the subject.

Figure 10:
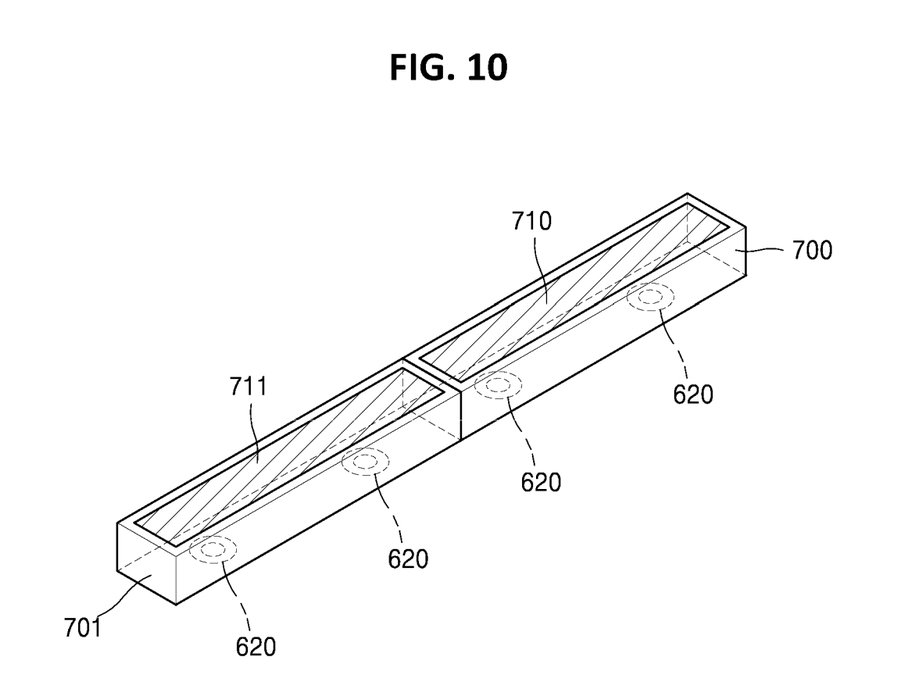
FIG. 10 is a perspective view showing an illumination device according to one embodiment of the present invention.

FIG. 10 is a perspective view showing an illumination device according to one embodiment of the present invention. In the following description, the redundant description of the elements described with reference to FIGS. 1 to 9 will be omitted.

Referring to FIG. 10, an illumination device of the present invention may include main bodies 700 and 701, a power supply device (not shown), light sources 710 and 711, and a detachable attachment device 620.

The power supply device is installed inside the main bodies 700 and 701 while being exposed to outer surfaces of the main bodies 700 and 701 to supply a power to the light sources 710 and 711 for emitting light in one direction.

The main bodies 700 and 701 have, for example, a triangular prism shape as shown in FIG. 10, and one of surfaces of the main bodies 700 and 701 other than surfaces of main bodies 700 and 701 at which the light sources 710 and 711 are installed is attached to one of the first to fourth body parts 100, 200, 300 and 400 so as to select a direction in which the light is irradiated.

The detachable attachment device 620 is preferably provided on a plurality of surfaces of the main bodies 700 and 701 other than the surfaces at which the light sources 710 and 711 are installed as shown in FIG. 10 so as to allow the main bodies 700 and 701 to be detachably attached to one of the first to fourth body parts 100, 200, 300 and 400. In the above example, similar to the folded state fixing device, the detachable attachment device 620 may include a magnetic coupling device having a magnetic body and a magnetizable body so as to be detachably attached to the folded state fixing device, but embodiments are not limited thereto. In addition, in the portable mode, attachment to the folded state fixing device may be achieved by the detachable attachment device 620, so that the detachable attachment device 620 may be attached to a plate shape and carried.

Meanwhile, as shown in FIG. 10, the main bodies 700 and 701 of the illumination device may be configured as two units which are detachably attached to each other, for example, by a magnetic coupling device 630, so that the user may use the illumination device by using one or two main bodies while adjusting an amount of light or an attachment position as necessary.

While all the elements configuring the embodiments of the present invention has been described as being coupled or being operated together in combination, the present invention is not limited to the embodiments. In other words, one or more of the elements may be selectively coupled and operated without departing from the scope of the present invention.

In addition, when some part "includes", "configures", or "has" some elements, unless explicitly described to the contrary, it means that other elements may be further included but not excluded. Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

As described above, the technical idea of the present invention has been described for illustrative purposes, and it is understood that various changes and modifications can be made by those of ordinary skill in the art to which the invention pertains without departing from the spirit and scope of the present invention. Therefore, the embodiments disclosed in the present invention are not intended to limit the scope of the present invention, and the scope of the technical idea of the present invention is not limited by the embodiments. The scope of the present invention should be construed according to the appended claims, and all technical ideas within the scope of equivalents thereof should be construed as being included in the scope of the present invention.

The invention claimed is:

1. A portable studio apparatus comprising:
a first body part forming a bottom surface; a second body part coupled to one end of the first body part and foldably or unfoldably connected to the first body part; a third body part foldably or unfoldably connected to the second body part at an opposite side of a portion of the second body part at which the second body part is connected to the first body part; a fourth body part foldably or unfoldably connected to the third body part at an opposite side of a portion of the third body part at which the third body part is connected to the second body part; a pair of sub-body parts formed at both ends of the first body part and the fourth body part in a direction orthogonal to an axis extending in a connection direction of the first body part to the fourth body part, and foldably or unfoldably connected to the first body part and the fourth body part; a folded state fixing device for fixing the first body part to the fourth body part and the sub-body parts in a folded state while the first body part to the fourth body part are folded to overlap with each other, and the sub-body parts are folded to overlap with the region at which the first body part to the fourth body part overlap with each other in the portable mode; and a light source installed in the fourth body part to irradiate light into the accommodation space,
wherein, in a photographing mode, the first body part to the fourth body part are folded at an angle larger than a right angle with respect to each other, and the sub-body parts formed on an identical side are fixedly connected to each other, such that the sub-body parts form an accommodation space by defining a side surface except for a region defined by the first body part to the fourth body part among open regions formed by the first body part to the fourth body part while the sub-body parts fix the first body part to the fourth body part in the folded state, in which a subject positioned within the accommodation space defined by the first body part to the fourth body part and the sub-body part is photographed through an open front side,
in a portable mode after the photographing mode is terminated, the first body part to the fourth body part are folded to overlap with each other, and the sub-body parts are folded to overlap with a region at which the first body part to the fourth body part overlap with each other, which allows the portable studio apparatus to be carried and stored in a form of a plate,
in the photographing mode, while the first body part to the fourth body part are folded, the fourth body part is inclined relatively to the first body part at an angle which allows the fourth body part to be directed toward a bottom such that the fourth body part partially covers an open front region of the region defined by the first body part to the fourth body part, and
the folded state fixing device comprises a magnetic coupling device including a magnetic body and a magnetizable body.

2. The portable studio apparatus of claim 1, wherein the sub-body part comprises:
a first sub-body part foldably or unfoldably connected to the first body part; and a fourth sub-body part foldably or unfoldably connected to the fourth body part, and
the sub-body part further comprises:
a pair of second sub-body parts formed at both ends of the second body part except for ends of the second body part at which the second body part is connected to the first body part and the third body part, and foldably or unfoldably connected to the second body part; and a pair of third sub-body parts formed at both ends of the third body part except for ends of the third body part at which the third body part is connected to the second body part and the fourth body part, and foldably or unfoldably connected to the third body part.

3. The portable studio apparatus of claim 2, wherein the first sub-body part to the fourth sub-body part comprise:
a sub-body part coupling device for allowing the first sub-body part to the fourth sub-body part to be coupled to each other while the first sub-body part to the fourth sub-body part are connected to each other to allow the sub-body parts to be fixedly connected to each other in the photographing mode.

4. The portable studio apparatus of claim 3, wherein the sub-body part coupling device comprises: a magnetic coupling device including a magnetic body and a magnetizable body.

5. The portable studio apparatus of claim 1, further comprising:
at least one illumination device comprising: a main body; a light source installed in the main body to irradiate light in one direction; and a detachable attachment device installed in the main body to allow the main body to be detachably attached to one of the first body part to the fourth body part.

6. The portable studio apparatus of claim 5, wherein the detachable attachment device is detachably attached to the folded state fixing device.

7. The portable studio apparatus of claim 6, wherein the detachable attachment device and the folded state fixing device comprise: a magnetic coupling device including a magnetic body and a magnetizable body.

* * * * *